United States Patent [19]

Walton, Jr.

[11] Patent Number: 5,206,044
[45] Date of Patent: Apr. 27, 1993

[54] WRAPPER FOR PREPARING A ROSIN BAKED POTATO

[76] Inventor: Daniel P. Walton, Jr., 470 Greenway Ave., Satellite Beach, Fla. 32937

[21] Appl. No.: 966,421

[22] Filed: Oct. 26, 1992

Related U.S. Application Data

[62] Division of Ser. No. 763,802, Sep. 23, 1991.

[51] Int. Cl.⁵ .................. B65D 81/34; B65D 65/42
[52] U.S. Cl. ................... 426/132; 162/127; 428/498; 426/113; 426/126; 426/127; 229/87.08
[58] Field of Search ............... 426/132, 126, 127, 412, 426/415, 523, 234, 243, 113, 637; 162/127, 180, 103, 105; 428/498, 467

[56] References Cited

U.S. PATENT DOCUMENTS

| | | | |
|---|---|---|---|
| 1,113,904 | 10/1914 | MacKintosh | 426/132 |
| 1,589,106 | 6/1926 | Campbell | 426/132 |
| 1,949,000 | 2/1934 | Yano | 162/180 |
| 2,357,258 | 8/1944 | Harris | 426/112 |
| 2,433,622 | 12/1947 | Novak | 426/132 |
| 2,516,978 | 8/1950 | Gottesman | 426/113 |
| 2,528,233 | 10/1950 | Kubricht | 426/132 |
| 2,759,830 | 8/1956 | Touceda | 426/132 |
| 2,902,371 | 9/1959 | Shorr | 426/132 |
| 2,951,765 | 9/1960 | Robson | 426/113 |
| 3,038,811 | 6/1962 | Reading | 426/113 |
| 3,126,284 | 3/1964 | Howerin | 426/132 |
| 3,322,319 | 5/1967 | Sweeney et al. | 426/113 |
| 3,730,737 | 5/1973 | Harvey et al. | 426/132 |
| 3,750,873 | 8/1973 | Roman | 426/113 |
| 3,881,023 | 4/1975 | Wilson | 426/132 |
| 4,299,851 | 11/1981 | Lowe | 426/132 |
| 4,390,554 | 6/1983 | Levinson | 426/113* |
| 4,404,241 | 9/1983 | Mueller et al. | 426/113 |
| 4,781,931 | 11/1988 | Jon et al. | 426/132 |
| 4,861,957 | 8/1989 | Wells | 426/113 |
| 4,975,292 | 12/1990 | Loizzi | 426/132 |

FOREIGN PATENT DOCUMENTS

| | | | |
|---|---|---|---|
| 149403 | 8/1949 | Australia | 426/113 |
| 56-21547 | 2/1981 | Japan | 426/132 |

*Primary Examiner*—Steven Weinstein

[57] ABSTRACT

A wrapper for preparing a rosin baked potato by wrapping a whole potato in a wrapper formed from a rosin impregnated absorbent cellulosic substrate laminated by rosin to a flexible sheet and allowing melted rosin to be retained around the potato as the potato is baked in a heating apparatus.

18 Claims, No Drawings

WRAPPER FOR PREPARING A ROSIN BAKED POTATO

BACKGROUND OF THE INVENTION

This is a division of Ser. No. 763,802 filed Sep. 23, 1991.

This invention relates to baking potatoes, and more particularly to a rosin impregnated wrapper for producing an improved baked potato product.

The preparation of rosin baked potatoes is a well known art, particularly in Southern areas of the United States of America where gum rosin from the pine tree is readily available.

In a typical recipe, a kettle of gum rosin is heated to about 275 degrees F. or until boiling, and potatoes are lowered into the rosin one at a time for cooking until the potato rises to the surface or for a longer time. The potato is then removed and wrapped in a foot square sheet of heavy paper. The potato is cut open through paper in top for serving with butter or other toppings.

A large restaurant chain features a rosin baked potato, starting with an extra large potato and then cooking it in boiling pine rosin. The rosin cooks the potato to a uniform fluffy white doneness for a superior flavor and texture. Their menu states "This is probably the most unusual method for preparing a baked potato (they're actually cooked in a big pot of boilin' pine rosin) but most folks say "the taste is worth the effort". It's a very special baked potato and we serve it with genuine butter and real sour cream.

Wrapping potatoes in aluminum foil for baking purposes is found in cookbooks currently in publication. Instructions for rosin cooking of potatoes are also found in publications and referenced herein. The novelty of this invention is derived from the unique combination of flexible sheet, absorbing paper, and rosin into a wrapper product to enable cooking a baked potato in a new way.

U.S. Pat. No. 3,689,282 issued to Feinberg discloses a method of cooking whole potatoes in a salt solution. No flavor enhancement is produced by this process.

Laminated aluminum foil wrappers have been disclosed in U.S. Pat. No. 3,865,664 issued to Neumann using wax and adhesive to produce a candy wrapper; such aluminum foil wrapper not being effective for the purpose of this invention.

An ovenable food tray formed from paperboard coated with food grade resin is disclosed in U.S. Pat. No. 4,757,940 issued to Quick et al. In this invention the resin coated paperboard is laminated to a paper coated with a flame retardant to provide resistance to flaming. Although this invention teaches the beneficial use of a food grade resin for oven use, the product of the invention is not flexible for use as a wrapper such as is the subject of this invention.

U.S. Pat. No. 4,391,833 issued to Self et al. describes a paper coating material suitable for oven temperatures, e.g. 350 degrees F. without melting, and also teaches that this material should not affect the taste of the food cooked therein. This is contrary to this invention which desires the paper coating (rosin) to melt to simulate the effects of cooking potatoes in liquid rosin and to add a distinctive flavor to the baked potato.

The existing methods of producing a rosin baked potato have several disadvantages. The hot rosin in an open kettle or other container presents a spill hazard, inserting and removing potatoes present a splash hazard; and the kettle, rosin, and other equipment require much storage space. A large quantity or rosin must be purchased to bake a potato.

SUMMARY OF THE INVENTION

Accordingly, an object of the present invention is the provision of means to allow a potato to be baked in contact with melted rosin without the necessity of being immersed in hot rosin. The presence of melted rosin next to the potato skin aids heat transfer into the potato and adds a delightful flavor to the baked potato product.

The baked potato product of this invention is thus superior to a potato oven baked in similar fashion with only an aluminum foil wrapping or with no wrapping.

In addition to the taste enhancement, the rosin, which was liquified during the baking process, solidifies in the cellulose substrate formed around the potato causing the wrapper to adhere to the potato skin; thus forming a somewhat rigid container which facilitates eating of the baked potato processed by this invention.

The presence of absorbing paper enables a larger quantity of rosin to be laminated to the flexible sheet and serves an important containment purpose during the baking process to prevent the melted rosin from flowing between the potato and the flexible outer wrapping onto the bottom of the oven.

Whereas a paper wrapping alone will burn if used for a gas or electric oven baked potato, it has been discovered that with the metal foil on the outside and rosin on the inside; the paper, although darkening in color, does not inflame when used as a wrapping to produce a rosin baked potato per the instructions of this invention.

Generally taught laminating methods for paper, plastic film, or metal foil involve adhesives or wax. Rosin is not generally used as a laminate for these applications because rosin is very brittle when cooled from a melted state. Therefore, a novel laminating method using rosin, paper and metal foil or plastic film was developed for this invention.

Still other advantages and benefits of the invention will become apparent to those skilled in the art upon a reading and understanding of the following detailed description.

DETAILED DESCRIPTION OF THE PREFERRED EMBODIMENT

A wrapper for preparing a rosin baked potato is prepared per this invention as a laminated sheet 8¼ inches wide and 10 inches long. The outer layer of the wrapper is a flexible sheet which is a metal foil for electric or gas oven use and a plastic film for microwave oven use. The preferred metal foil is an aluminum foil selected from a range of aluminum foil thicknesses of 0.00025 in. (0.0064 mm) through 0.0015 in. (0.038 mm). The preferred plastic film is a polyvinylidene chloride/polyvinyl chloride copolymer film.

Laminated to the flexible sheet is two ply absorbant paper sheets which are impregnated and layered with rosin. The preferred paper is manufactured without dyes or inks. The preferred method for coating and lamination of the rosin coated paper to the flexible sheet can be accomplished using rosin as the laminate by evaporation of a solvent containing rosin in solution.

Whereas Grade "M" rosin is used in the preferred embodiment, other rosin grades per ASTM Standard D 509-70 of greater and lesser quality can be used for the purpose of this invention by those skilled in the art. The rosin is applied as about a 30 to 50 percent by weight solution of rosin in an organic solvent which is added directly to the absorbant paper placed on top of the flexible sheet thereby allowing rosin solution to impregnate the absorbant paper and layering said paper with rosin when the solvent is evaporated. The preferred solvent is isopropyl alcohol, although other solvents such as methyl alcohol and various denatured ethyl alcohols may be used for the purposes of this invention.

Accelerated evaporation of the solvent has been demonstrated by heating the product to about 100 to 180 degrees F. Melting the deposited rosin is to be avoided, as the rosin becomes brittle when cooled from a melted state, resulting in lessening the flexibility of the wrapper product.

Perforations about 1/16 inch diameter and spaced about 1 inch apart are added to the wrapper for baking a potato in a gas or electric oven and 3 to 10 like perforations are added to the wrapper and extending through the potato skin for baking a potato in a microwave oven.

The wrapper is produced in a roll about 6 to 12 inches wide and a length from about 10 to 100 feet, or a length suitable to provide wrapping for multiple numbers of potatoes; with individual potato wrappers cut by the user about 6 to 12 inches wide and about 6 to 12 inches long.

EXAMPLE 1

For the demonstration of this invention, Grade "M" rosin selected especially for rosin potatoes by the supplier, FRP Company, Baxley, Ga. was dissolved at about 45 percent by weight ratio in 99+ percent ACS grade isopropyl alcohol supplied by AAPER Alcohol and Chemical Co., Shelbyville, Ky.

This solution was applied to the foil and paper by roller, although brush, dip, and spray applications are also acceptable methods. Rate of application of this solution was about 1 ounce per square foot, or an amount limited by the absorption capability of the paper. The flexible sheet used was a 12 inch wide roll of commercial food grade aluminum foil, "Reynolds Wrap" produced by Reynolds Metals Company, Richmond, Va. The absorbant paper used was a two ply 11 inch wide roll of "Microwave Bounty" paper towels produced by Procter & Gamble, Cincinnati, Ohio. The solvent was evaporated at ambient conditions which required about 12 hours.

The laminate was cut into 8½ inch by 10 inch sheets using a paper cutter. Perforations about 1/16 inch diameter and spaced about 1 inch apart were added to the sheet with a hole punch to allow expanding gases and steam to vent during baking.

Although the method of this invention will improve baking of any size or variety of potato, the preferred potato for use is a medium to large, or about 8 ounce to 16 ounce Russet Burbank variety. The potato to be rosin baked is first scrubbed to remove dirt. It is then placed onto the rosin side of the wrapper. The wrapper is rolled around the body of the potato and the sides are then folded down and under the potato. The potato, thus fully wrapped with foil on the outside, is baked in an oven for about 1 to 1½ hours depending on the size of the potato and at a temperature of about 350 to 400 degrees F. The potato is cooled for about 15 minutes after removal from the oven. The top of the potato is then cut with a knife, preferably in an "X" pattern, and the cut wrapping and potato skin is folded back, exposing the fluffy white inside for the addition of butter and condiments. The potato skin remains with the wrapper and is not consumed.

EXAMPLE 2

The aluminum foil wrapper is not suitable for use in a microwave oven. An alternate wrapper for use in a microwave oven was produced essentially by replacing the aluminum foil with another flexible sheet which may comprise paper or plastic film. The preferred material chosen was a polyvinylidene chloride/polyvinyl chloride copolymer plastic film.

For the demonstration of this invention, Grade "M" rosin selected especially for rosin potatoes by the supplier, FRP Company, Baxley, Ga. was dissolved at about 45 percent by weight ratio in 99+ percent ACS grade isopropyl alcohol supplied by AAPER Alcohol and Chemical Co., Shelbyville, Ky.

This solution was applied to the plastic film and paper by roller, although brush, dip, and spray applications are also acceptable methods. Rate of application of this solution was about 1 ounce per square foot, or an amount limited by the absorption capability of the paper. The plastic film used was a 11½ inch wide roll of commercial food grade film, "Saran Wrap" produced by DowBrands Inc., Indianapolis, Ind. The absorbant paper used was a two ply 11 inch wide roll of "Microwave Bounty" paper towels produced by Procter & Gamble, Cincinnati, Ohio. The solvent was evaporated at ambient conditions which required about 12 hours.

The laminate was cut into 8½ inch by 10 inch sheets using a paper cutter.

Although the method of this invention will improve baking of any size or variety of potato, the preferred potato for use is a medium to large, or about 8 ounce to 16 ounce Russet Burbank variety. The potato to be rosin baked is first scrubbed to remove dirt. It is then placed onto the rosin side of the wrapper. The wrapper is rolled around the body of the potato and the sides are then folded down and under the potato. Using a fork, awl, knife tip, or other pointed instrument; the wrapper and potato skin is perforated on top and sides with about 3 to 10 holes to allow steam and vapors to escape during baking. The potato, thus fully wrapped with plastic film on the outside, is baked in a microwave oven on high power for about 4 to 10 minutes depending on the size of the potato. The potato is cooled for about 10 minutes after removal from the oven. The top of the potato is then cut with a knife, preferably in an "X" pattern, and the cut wrapping and potato skin is folded back, exposing the fluffy white inside for the addition of butter and condiments. The potato skin remains with the wrapper and is not consumed.

While particular forms of the invention have been illustrated and described with reference to the preferred embodiment, it will be apparent that various modifications can be made without departing from the spirit and scope of the invention. Accordingly, it is not intended that the invention be limited except as by the appended claims.

It is claimed:

1. A flexible laminated wrapper for preparing a rosin baked potato consisting essentially of a flexible sheet comprising either a plastic film or a metal foil, laminated by rosin to a flexible absorbent cellulosic substrate, said flexible wrapper being dimensioned to fully enwrap a whole potato and said flexible absorbent cellulosic substrate being coated with rosin such that the substrate is impregnated and layered with an amount of rosin such that when said whole potato is fully enveloped with said flexible wrapper with said potato being placed in contact with the rosin coated substrate side of said wrapper and said wrapped potato is baked in a heating apparatus, said layered and absorbed rosin is melted and retained around said potato during the heating to improve the heat transfer into said potato and allow said melted rosin to flavor said potato and such that after said rosin is allowed to cool sufficient to resolidify on and within said cellulosic substrate after heating is completed, said flexible wrapper forms a somewhat rigid container around said potato and adheres to the potato skin which facilitates eating the fluffy potato food contained within said potato skin.

2. The wrapper as described in claim 1 wherein said cellulosic substrate coated with rosin and laminated to said flexible sheet is one or more absorbent paper sheets.

3. The wrapper as described in claim 1 wherein said flexible sheet is a metal foil.

4. The wrapper as described in claim 3 wherein said heating apparatus is an oven.

5. The wrapper as described in claim 3 wherein said metal foil is aluminum foil.

6. The wrapper as described in claim 3 wherein said wrapper further includes venting means comprising a plurality of perforations formed in said wrapper to allow expanding gases and steam to escape when baking said potato contained within said wrapper.

7. The wrapper as described in claim 1 wherein said flexible sheet is a plastic film.

8. The wrapper as described in claim 7 wherein said heating apparatus is a microwave oven.

9. The wrapper as described in claim 7 wherein said plastic film is a polyvinylidene chloride/polyvinyl chloride copolymer film.

10. The wrapper as described in claim 7 where the additional provision of a venting means comprises a plurality of perforations formed through said wrapper to allow expanding gases and steam to escape during baking.

11. The wrapper as described in claim 1 wherein said wrapper is produced about 6 to 12 inches wide and about 6 to 12 inches long.

12. The wrapper as described in claim 1 wherein said wrapper is produced in a roll about 6 to 12 inches wide and a length suitable to provide wrapping for multiple numbers of potatoes; with individual potato wrappers cut by the user.

13. The wrapper as described in claim 1 wherein said rosin is Grade M per ASTM Standard D 509-70.

14. The wrapper as described in claim 1 wherein said flexible sheet laminated by rosin to a cellulosic substrate impregnated and layered with rosin is produced by a process wherein rosin is dissolved in an organic solvent and the solution applied to said cellulosic substrate on said flexible sheet whereby said rosin dissolved in said organic solvent is absorbed within and layered onto said cellulosic substrate such that when said organic solvent evaporates, said rosin is finely dispersed within and onto said cellulosic substrate to allow flexibility of the wrapper for use in wrapping said potato prior to baking.

15. The wrapper as described in claim 14 wherein said rosin is dissolved in proportions of about 30 to 50 percent by weight, or until said rosin is saturated in said organic solvent.

16. A wrapper as described in claim 15, wherein said solution is applied in an amount of about 1 ounce per square foot, or an amount limited by the absorption capability of said cellulosic substrate.

17. The wrapper as described in claim 14 wherein said organic solvent is 99+ percent isopropyl alcohol.

18. The wrapper as described in claim 14 wherein the laminated product is heated to about 100 to 180 degrees F. to facilitate evaporation of the solvent and/or solvent recovery.

* * * * *